(12) United States Patent
Wakimoto et al.

(10) Patent No.: US 11,342,637 B2
(45) Date of Patent: May 24, 2022

(54) SECONDARY BATTERY INCLUDING BENT COLLECTOR TABS BETWEEN ELECTRODE BODY AND SEALING PLATE

(71) Applicant: SANYO Electric Co., Ltd., Daito (JP)

(72) Inventors: Ryoichi Wakimoto, Hyogo (JP); Hiroyuki Yamada, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 113 days.

(21) Appl. No.: 16/711,800

(22) Filed: Dec. 12, 2019

(65) Prior Publication Data
US 2020/0212413 A1 Jul. 2, 2020

(30) Foreign Application Priority Data

Dec. 27, 2018 (JP) .............................. JP2018-245923

(51) Int. Cl.
*H01M 50/54* (2021.01)
*H01M 50/183* (2021.01)

(52) U.S. Cl.
CPC ......... *H01M 50/54* (2021.01); *H01M 50/183* (2021.01)

(58) Field of Classification Search
CPC ........................... H01M 50/54; H01M 50/183

USPC ........................................................ 429/161
See application file for complete search history.

(56) References Cited

U.S. PATENT DOCUMENTS

2015/0340663 A1* 11/2015 Minagata .......... H01M 10/0413
429/163
2018/0013123 A1* 1/2018 Ito ....................... H01M 50/147

FOREIGN PATENT DOCUMENTS

JP 2003-242957 A 8/2003

* cited by examiner

*Primary Examiner* — Sean P Cullen
(74) *Attorney, Agent, or Firm* — WHDA, LLP

(57) ABSTRACT

A secondary battery including external terminals provided on an outer side of a sealing plate of a battery case, lead terminals provided on an inner side of the sealing plate, the lead terminals connected to the external terminals being fixed to the sealing plate, collector members disposed on the inner side of the sealing plate, the collector members being connected to the lead terminals, and pluralities of collector tabs connected to a positive electrode plate and a negative electrode plate at an end portion of an electrode body. The pluralities of collector tabs are connected to the collector members, and the electrode body is accommodated inside the battery case while having the pluralities of collector tabs be in a bent state in an inner space defined by the sealing plate.

2 Claims, 7 Drawing Sheets

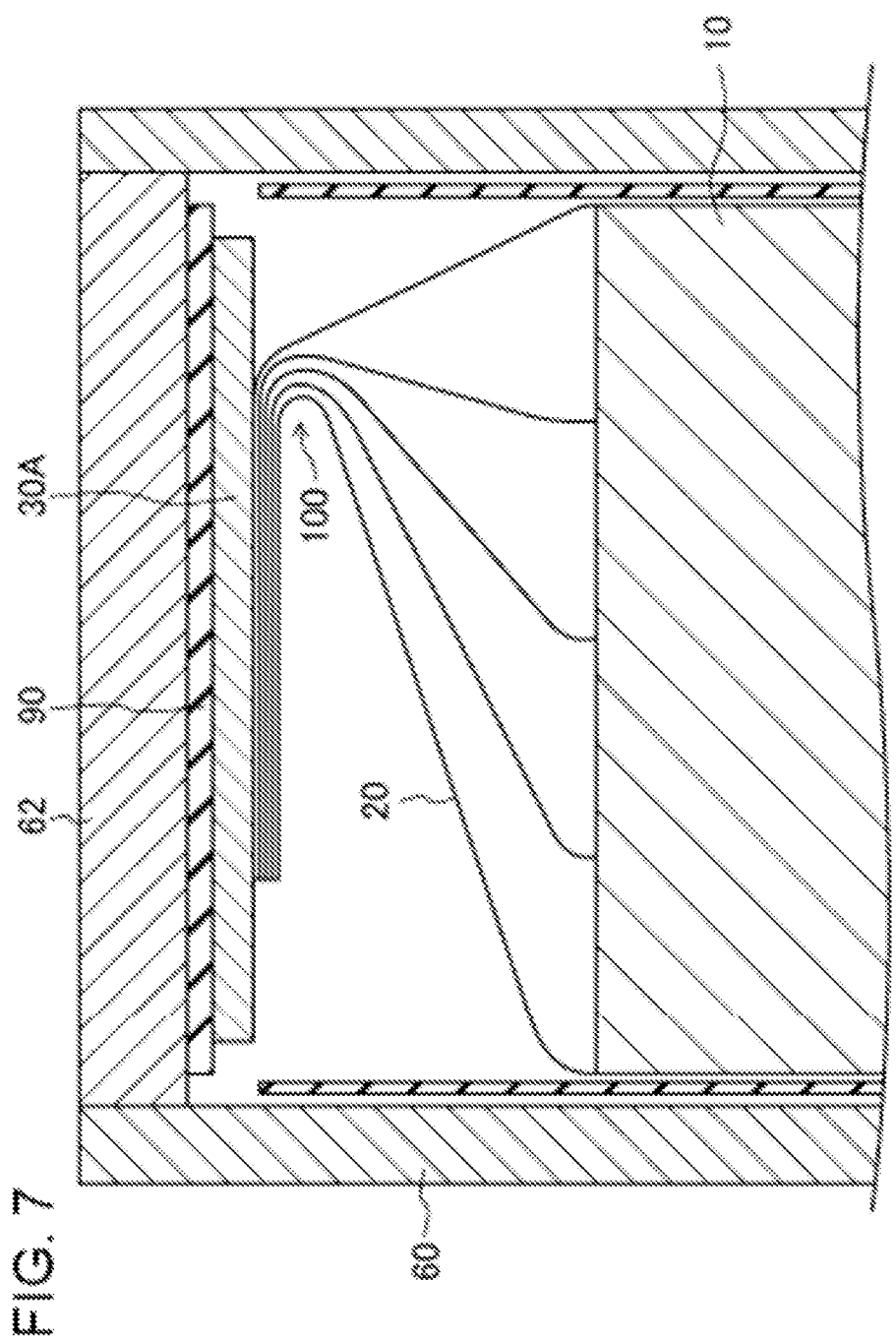

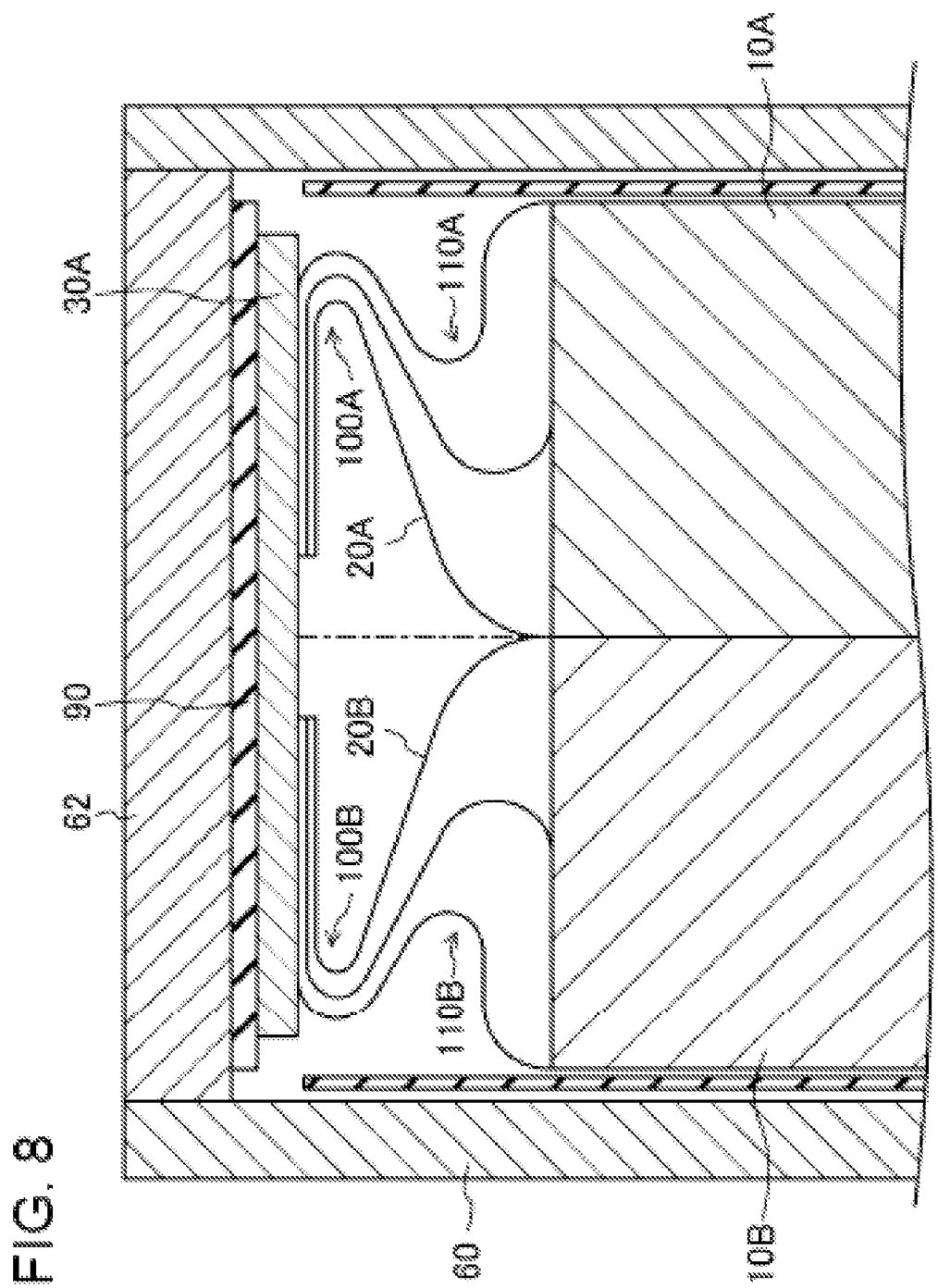

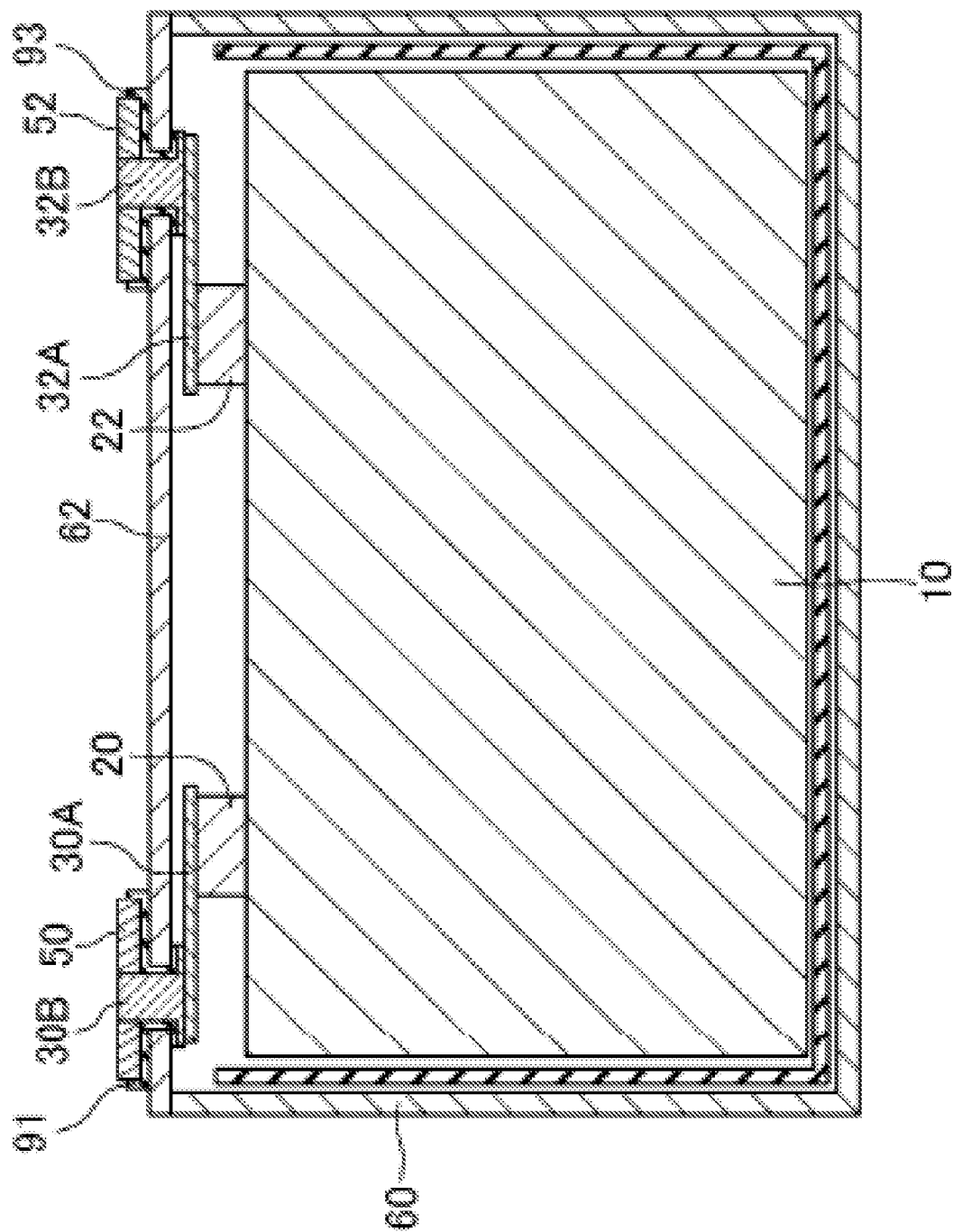

SECONDARY BATTERY INCLUDING BENT COLLECTOR TABS BETWEEN ELECTRODE BODY AND SEALING PLATE

CROSS REFERENCE TO RELATED APPLICATIONS

The present invention application claims priority to Japanese Patent Application No. 2018-245923 filed in the Japan Patent Office on Dec. 27, 2018, the entire contents of which are incorporated herein by reference.

BACKGROUND OF THE INVENTION

Field of the Invention

The present invention relates to a secondary battery having a structure in which collector tabs connected to positive and negative electrode plates are connected, through collector members, to lead terminals and external terminals fixed to a sealing plate.

Description of Related Art

In recent years, lithium ion secondary batteries are favorably used as on-vehicle power sources or as power sources of a personal computer and a portable terminal. A battery structure including an electrode body, in which positive electrode plates and negative electrode plates are stacked alternately with separators in between, is known as one of such lithium ion secondary batteries.

For example, Japanese Published Unexamined Patent Application No. 2003-242957 (Patent Document 1) discloses a lithium ion secondary battery in which an electrode body, the electrode body including a plurality of positive electrode plates and a plurality of negative electrode plates stacked alternately with separators in between, is accommodated in a battery case. Patent Document 1 discloses an assembling process in which, after connecting end portions of leads (tabs) drawn out from one end of the electrode body to internal terminals (lead terminals) mounted on a sealing plate, the electrode body is accommodated in an inner space of a battery case while bending the leads, and an opening portion of the battery case is sealed with the sealing plate.

With the above, the positive electrode plates and the negative electrode plates are connected to external terminals through the leads and the internal terminals. Note that rivet-shaped external terminals penetrate through the sealing plate and caulk and fix the internal terminals.

BRIEF SUMMARY OF THE INVENTION

In the assembling process of the lithium ion secondary battery disclosed in Patent Document 1, the end portions of the leads (the tabs) drawn out from one end of the electrode body are connected to the internal terminals (the lead terminals) by welding or the like. However, since the internal terminals are attached to the sealing plate, when connecting the end portions of the leads to the internal terminals, the sealing plate gets in the way and workability is poor.

Accordingly, a structure that improves workability can be conceived in which end portions of leads (tabs) drawn from one end of the electrode body is connected, through collector members, to internal terminals (lead terminals) attached to the sealing plate. Such a structure can be assembled by, first, connecting the end portions of the leads (the tabs) to the collector members by welding or the like and, then, by connecting the collector members, to which the leads have been connected, to the internal terminals (the lead terminals) attached to the sealing plate. In other words, in such an assembling process, there is no sealing plate that gets in the way when the end portions of the leads are connected to the collector members; accordingly, workability is improved substantially.

However, in such a structure, the collector members are only connected to the internal terminals and the collector members themselves are not fixed to the sealing plate. Accordingly, when a strong impact or the like is applied to the secondary battery, the electrode body moves inside the battery case and, accordingly, the collector members are pulled by the leads (the tabs). Accordingly, the collector members vibrate about the connections between the collector members and the internal terminals (the lead terminals) so as to become detached from and attached to the sealing plate. As a result, a large load is applied to the connections between the collector members and the internal terminals (the lead terminals) and a problem such as the connections becoming damaged or broken occurs. With the structure of the secondary battery disclosed in Patent Document 1 in which the leads (the tabs) are directly connected to the internal terminals (the lead terminal) without having the collector members in between, the internal terminals (extracting electrodes) are fixed to the sealing plate and the problem described above does not occur.

The present invention has been made in view of the above point, and an object thereof is to provide a secondary battery in which damages in the connections between the collector members and the lead terminals are suppressed. The secondary battery is structured so that the collector tabs connected to the positive and negative electrode plates are connected to the lead terminals and the external terminals, which are fixed to the sealing plate, through the collector members.

A secondary battery according to the present invention includes an electrode body including a positive electrode plate and a negative electrode plate, a battery case provided with an opening portion, the battery case accommodating the electrode body, a sealing plate that seals the opening portion, external terminals provided on an outer side of the sealing plate, lead terminals provided on an inner side of the sealing plate, the lead terminals connected to the external terminals being fixed to the sealing plate, collector members disposed on the inner side of the sealing plate, the collector members being connected to the lead terminals, and pluralities of collector tabs connected to the positive electrode plate and the negative electrode plate at an end portion of the electrode body on a sealing plate side. In the secondary battery, the pluralities of collector tabs are connected to the collector members, and the electrode body is accommodated inside the battery case while having the pluralities of collector tabs be in a bent state in an inner space defined by the sealing plate.

According to the present invention, damages in the connections between the collector members and the lead terminals can be suppressed in the secondary battery structured so that the collector tabs connected to the positive and negative electrode plates are connected to the lead terminals and the external terminals, which are fixed to the sealing plate, through the collector members.

BRIEF DESCRIPTION OF THE SEVERAL VIEWS OF THE DRAWINGS

FIG. 7 illustrates a first modification and is a partial cross-sectional view of a vicinity of a positive electrode collector member in a short direction of a sealing plate.

FIG. 8 illustrates a second modification and is a partial cross-sectional view of a vicinity of a positive electrode collector member in a short direction of a sealing plate.

FIG. 9 is a cross-sectional view schematically illustrating a configuration of a secondary battery according to a third modification.

DETAILED DESCRIPTION OF THE INVENTION

Hereinafter, an exemplary embodiment of the present invention will be described in detail with reference to the drawings. Note that the present invention is not limited to the following exemplary embodiment. Furthermore, modifications can be appropriately made within the range in which the effect of the present invention can be attained.

Figure 1:
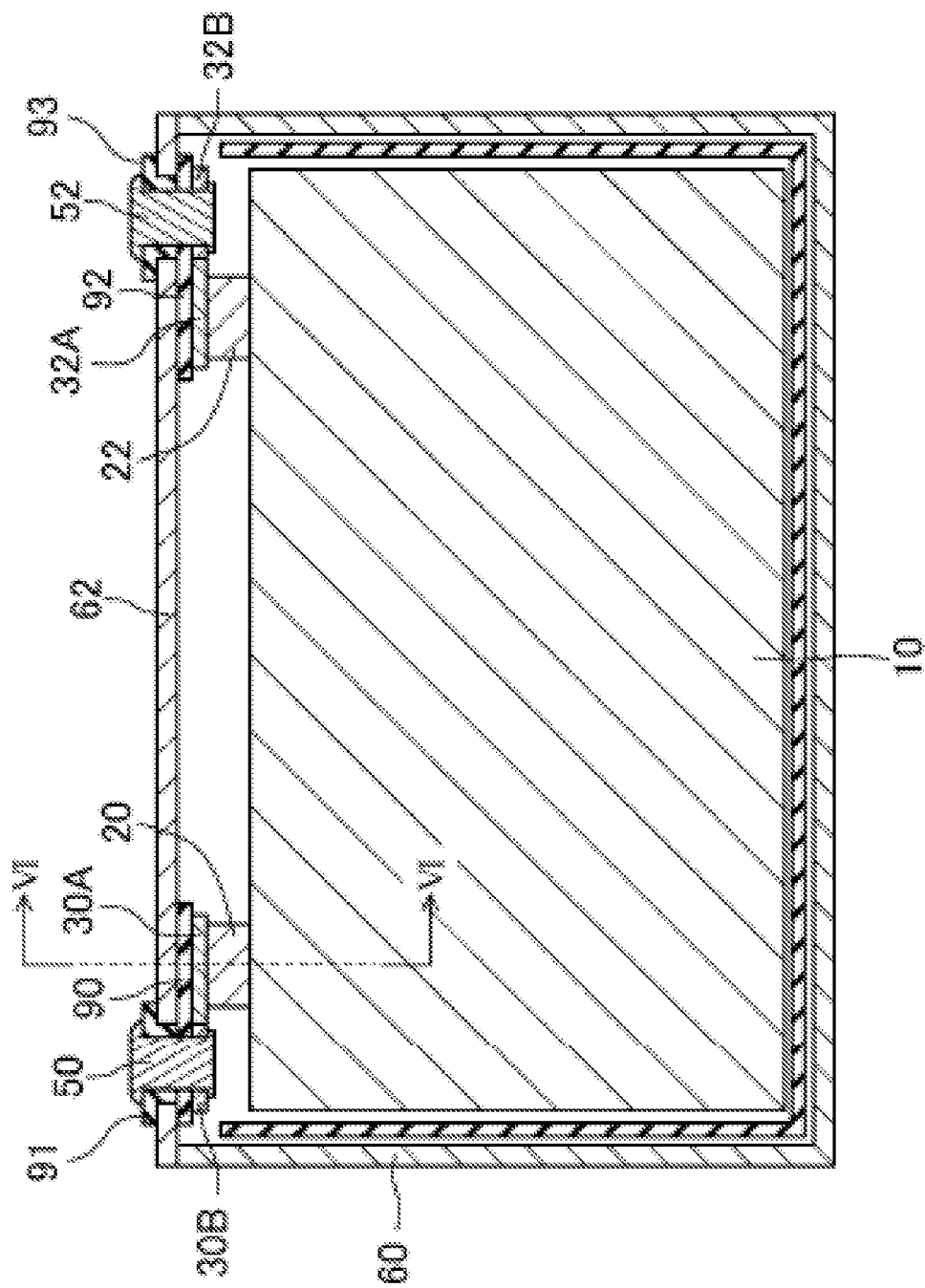
FIG. 1 is a cross-sectional view schematically illustrating a configuration of a secondary battery according to an exemplary embodiment of the present invention.

FIG. 1 is a cross-sectional view schematically illustrating a configuration of a secondary battery according to an exemplary embodiment of the present invention.

As illustrated in FIG. 1, the secondary battery according to the present exemplary embodiment includes an electrode body 10 that includes positive electrode plates and negative electrode plates, a battery case 60 that houses the electrode body 10, and a sealing plate 62 that seals an opening portion of the battery case 60.

A plurality of positive electrode collector tabs 20 connected to the positive electrode plates in an end portion of the electrode body 10 on the sealing plate 62 side are bunched together and connected to a positive electrode collector member 30A. Similarly, a plurality of negative electrode collector tabs 22 connected to the negative electrode plates are bunched together and are connected to a negative electrode collector member 32A. Note that the positive electrode collector tabs 20 and the negative electrode collector tabs 22 are formed of metal foil. Furthermore, the positive electrode collector member 30A and the negative electrode collector member 32A are formed of metal plates.

The positive electrode collector member 30A is connected to the positive electrode external terminal 50 provided on the outer side of the sealing plate 62 through a positive electrode lead terminal 30B provided on the inner side of the sealing plate 62. Similarly, the negative electrode collector member 32A is connected to the negative electrode external terminal 52 provided on the outer side of the sealing plate 62 through a negative electrode lead terminal 32B provided on the inner side of the sealing plate 62. Note that the lead terminals 30B and 32B are formed of metal plates.

An insulating member 90 is disposed between the positive electrode collector member 30A and the positive electrode lead terminal 30B, and the sealing plate 62. Similarly, an insulating member 92 is disposed between the negative electrode collector member 32A and the negative electrode lead terminal 32B, and the sealing plate 62. Furthermore, the positive electrode external terminal 50 is fixed to the sealing plate 62 by caulking with a gasket 91 interposed therebetween. Similarly, the negative electrode external terminal 52 is fixed to the sealing plate 62 by caulking with a gasket 93 interposed therebetween. Furthermore, the positive electrode lead terminal 30B and the insulating member 90 are fixed to the sealing plate 62 by caulking the positive electrode external terminal 50. Similarly, the negative electrode lead terminal 32B and the insulating member 92 are fixed to the sealing plate 62 by caulking the negative electrode external terminal 52.

Figure 2:
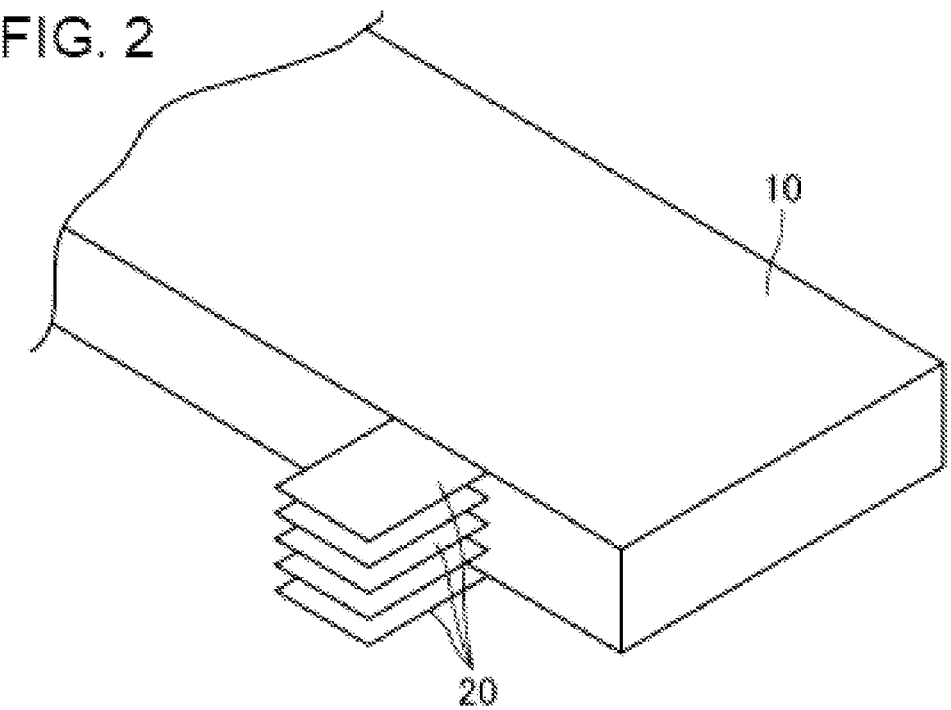
FIG. 2 is a diagram illustrating an assembling process of the secondary battery.
Figure 3:
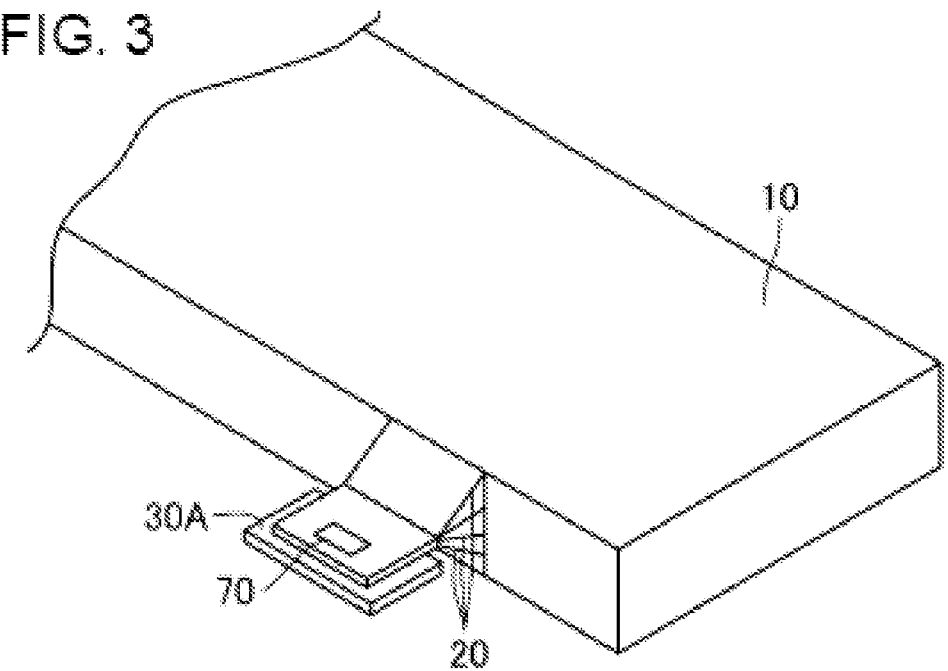
FIG. 3 is a diagram illustrating the assembling process of the secondary battery.
Figure 4:
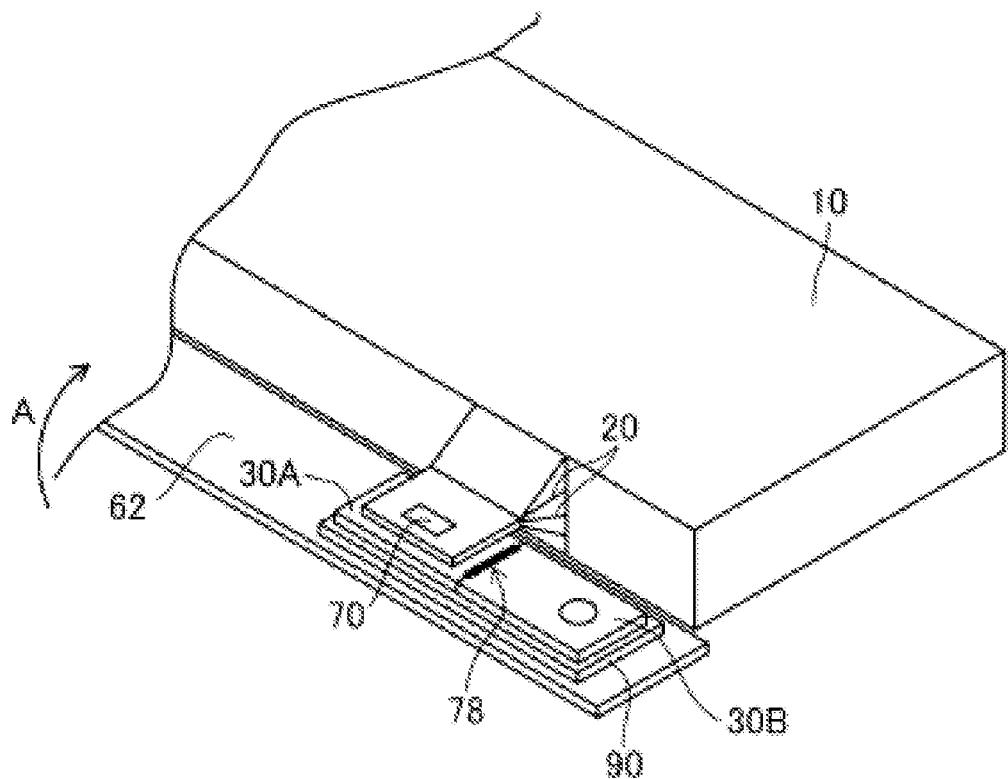
FIG. 4 is a diagram illustrating the assembling process of the secondary battery.

Referring next to FIGS. 2 to 4, an assembling process of the secondary battery illustrated in FIG. 1 will be described.

FIG. 2 is a perspective view illustrating a state in which the plurality of positive electrode collector tabs 20 connected to the positive electrode plates are protruding from an end portion of the electrode body 10.

As illustrated in FIG. 3, the plurality of positive electrode collector tabs 20 in the above state are bunched together and stacked on one another, and are mounted on the positive electrode collector member 30A. Subsequently, the positive electrode collector tabs 20 and the positive electrode collector member 30A are connected to each other by ultrasonic joining or resistance welding, for example. With the above, the positive electrode collector tabs 20 and the positive electrode collector member 30A are connected to each other at a connection 70.

Subsequently, as illustrated in FIG. 4, the sealing plate 62, the positive electrode external terminal 50, the insulating member 90, and the positive electrode lead terminal 30B are connected and fixed to each other in advance as a single member, and the positive electrode collector member 30A to which the positive electrode collector tabs 20 have been connected is mounted on the single member. In so doing, the positive electrode collector member 30A is mounted next to the positive electrode lead terminal 30B so as to be in contact therewith. Subsequently, portions of the positive electrode collector member 30A and the positive electrode lead terminal 30B that are in contact with each other are connected by laser welding, for example. With the above, the positive electrode collector member 30A and the positive electrode lead terminal 30B are connected to each other at a connection 78. Subsequently, the sealing plate 62 is rotated in an arrow A direction, and the electrode body 10 is accommodated in the battery case 60.

Lastly, the opening portion of the battery case 60 is sealed with the sealing plate 62 and the secondary battery of the present exemplary embodiment is assembled. In the above, the electrode body 10 is accommodated in the battery case 60 while having the positive electrode collector tabs 20 be in a bent state in the inner space defined by the sealing plate 62. Note that the negative electrode collector tabs 22, the negative electrode collector member 32A, the negative electrode lead terminal 32B, and the negative electrode external terminal 52 are assembled by a method similar to the above.

Incidentally, as illustrated in FIG. 4, the positive electrode collector member 30A is connected to the positive electrode lead terminal 30B by the connection 78 alone that is the portion where the positive electrode collector member 30A and the positive electrode lead terminal 30B are adjacent to each other. In other words, other than the connection 78, the positive electrode collector member 30A is only abutted to the insulating member 90 (the sealing plate 62) side and is not fixed to the sealing plate 62.

Figure 5:
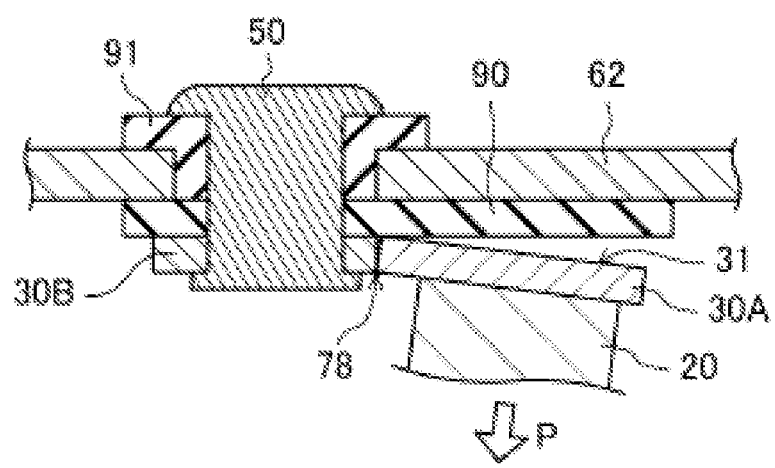
FIG. 5 is a partially enlarged view in which a vicinity of a positive electrode external terminal in FIG. 1 has been enlarged.

FIG. 5 is a partially enlarged view in which the vicinity of the positive electrode external terminal 50 in FIG. 1 has been enlarged.

As illustrated in FIG. 5, when a strong impact or the like is applied to the secondary battery, the electrode body moves inside the battery case and, accordingly, the positive electrode collector member 30A is pulled towards an arrow P direction by the positive electrode collector tabs 20. With the above, a surface 31 of the positive electrode collector member 30A abutting against the insulating member 90 vibrates about the connection 78 between the positive electrode collector member 30A and the positive electrode lead terminal 30B so as to become detached from and attached to the insulating member 90. As a result, a large load is applied to the connection 78 between the positive electrode collector member 30A and the positive electrode lead terminal 30B, and the connection 78 may become damaged or broken.

Figure 6:
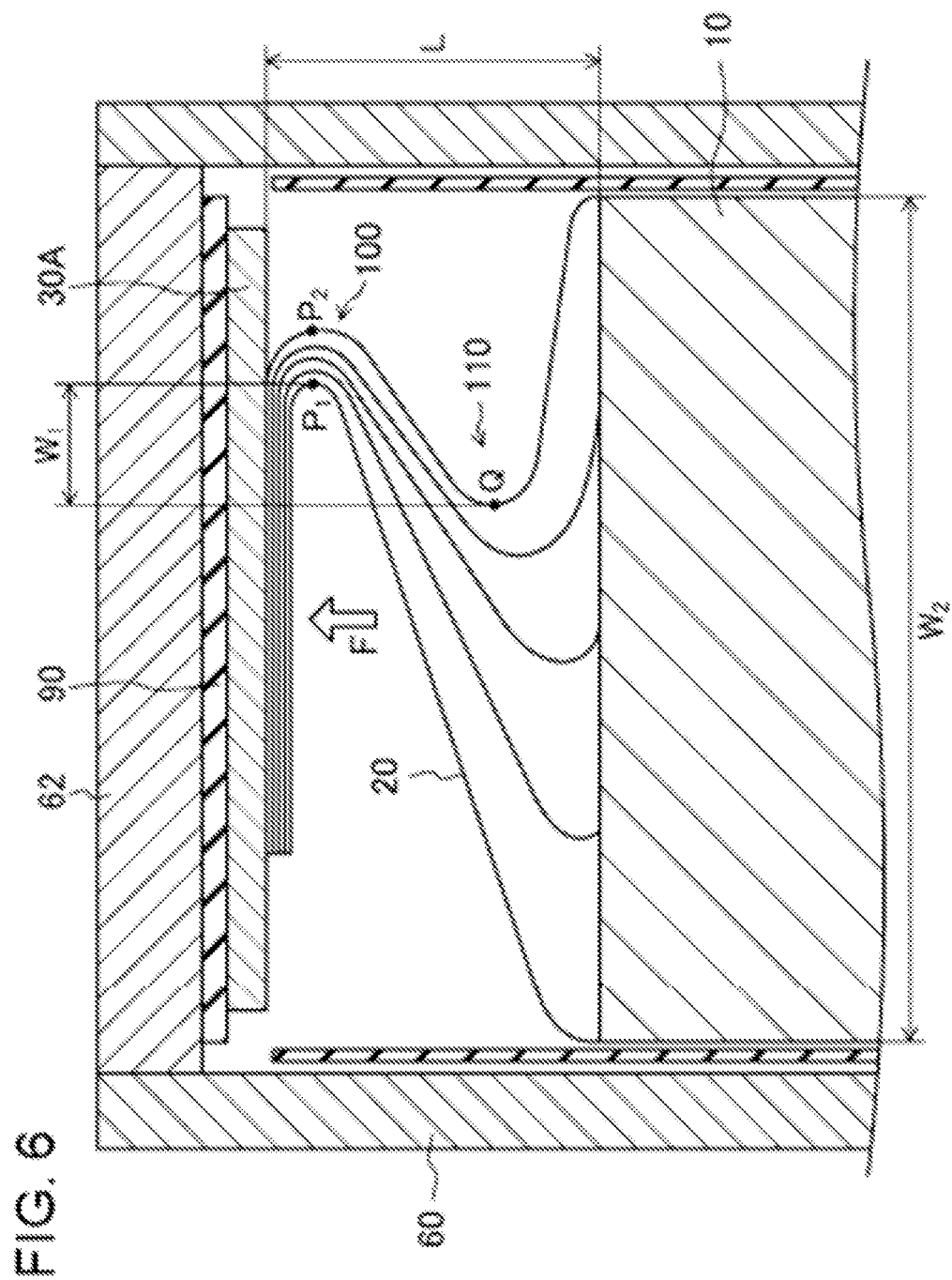
FIG. 6 is a cross-sectional view taken along line VI-VI in FIG. 1.

However, as illustrated in FIG. 6, in the present exemplary embodiment, the electrode body 10 is accommodated inside the battery case 60 while having the plurality of positive electrode collector tabs 20 include two bent portions 100 and 110 in the inner space defined by the sealing plate 62. Note that FIG. 6 is a cross-sectional view taken along line VI-VI in FIG. 1.

As illustrated in FIG. 6, the plurality of positive electrode collector tabs 20 include the two bent portions 100 and 110; accordingly, the positive electrode collector member 30A is pressed towards the insulating member 90 (the sealing plate 62) side at all times due to pushing force F caused by elastic force of the bent positive electrode collector tabs 20. Accordingly, even if a strong impact or the like is applied to the secondary battery, the positive electrode collector member 30A does not, as illustrated in FIG. 5, vibrate about the connection 78 between the positive electrode collector member 30A and the positive electrode lead terminal 30B. As a result, damage in the connection 78 between the positive electrode collector member 30A and the positive electrode lead terminal 30B can be suppressed and the reliability of the connection 78 is improved. Note that the connection between the negative electrode collector member 32A and the negative electrode lead terminal 32B provides a similar effect.

Furthermore, the secondary battery according to the present exemplary embodiment adopts a configuration in which end portions of the collector tabs 20 and 22 drawn out from the positive and negative electrode plates are connected to the lead terminals 30B and 32B, which are fixed to the sealing plate 62, through the collector members 30A and 32A. Accordingly, the secondary battery having such a structure can be assembled by, after connecting the end portions of the collector tabs 20 and 22 to the collector members 30A and 32A, connecting the collector members 30A and 32A connected to the collector tabs 20 and 22 to the lead terminals 30B and 32B fixed to the sealing plate 62. As a result, when connecting the end portions of the collector tabs 20 and 22 to the collector members 30A and 32A, there is no sealing plate 62 that is in the way; accordingly, workability is improved substantially.

In the present exemplary embodiment, by providing the two bent portions 100 and 110 in each of the pluralities of collector tabs 20 and 22, the collector tabs 20 and 22 themselves are given the pushing force F that pushes the collector members 30A and 32A towards the sealing plate 62 side. In order to exert the pushing force F in a more effective manner, desirably, the two bent portions 100 and 110 are formed as follows.

As illustrated in FIG. 6, when the bent portion formed on the sealing plate 62 side in the inner space defined by the sealing plate 62 is referred to as a first bent portion 100, and the bent portion formed on the electrode body 10 side is referred to as a second bent portion 110, a bending point Q in an innermost layer of the second bent portion 110 is, with respect to a bending point $P_1$ in an innermost layer of the first bent portion 100, desirably, on a side opposite a bending point $P_2$ in an outermost layer of the first bent portion 100. With the above, the pushing force F can be applied to the collector members 30A and 32A unerringly; accordingly, the pushing force F of the positive electrode collector tabs 20 towards the sealing plate 62 side can be increased further.

Furthermore, as illustrated in FIG. 6, when a distance between the bending point Q in the innermost layer of the second bent portion 110 and the bending point $P_1$ in the innermost layer of the first bent portion 100 in a direction parallel to the sealing plate 62 is $W_1$, and a width of the electrode body 10 in the direction parallel to the sealing plate 62 is $W_2$, preferably, a relationship $W_1 < \frac{1}{2} W_2$ is satisfied. The above is because when $W_1$ is too large, the bent portions become folded and restoring force of the bent portions is lost, and the pushing force F pushing the collector members 30A and 32A towards the sealing plate 62 side becomes small.

Furthermore, as illustrated in FIG. 6, when L is a distance between an end portion of the electrode body 10 on the sealing plate 62 side and an inner surface of the sealing plate 62, preferably, a relationship $W_1 < L$ is satisfied. The above is because when $W_1$ is too large, the bent portions become folded and restoring force of the bent portions is lost, and the pushing force F pushing the collector members 30A and 32A towards the sealing plate 62 side becomes small.

As described above, in the secondary battery having a structure in which the collector tabs 20 and 22 connected to the positive and negative electrode plates are connected to the lead terminals 30B and 32B and the external terminals 50 and 52, which are fixed to the sealing plate 62, through the collector members 30A and 32A, by accommodating the electrode body 10 in the battery case 60 while the pluralities of collector tabs 20 and 22 in the inner space defined by the sealing plate 62 are in a bent state, damages in the connections between the collector members 30a and 32A and the lead terminals 30B and 32B can be suppressed even when a strong impact is applied to the secondary battery.

First Modification

In the exemplary embodiment described above, the two bent portions (first bent portion 100, second bent portion 110) are provided in the plurality of positive electrode collector tabs 20 in the inner space defined by the sealing plate 62; however, as illustrated in FIG. 7, only a single bent portion may be provided in the plurality of positive electrode collector tabs 20. Note that FIG. 7 is a partial cross-sectional view of a vicinity of the positive electrode collector member 30A in a short direction of the sealing plate 62.

In the first modification as well, by providing the bent portion (first bent portion 100) in the plurality of positive electrode collector tabs 20, the positive electrode collector tabs 20 themselves can apply pushing force that pushes the positive electrode collector member 30A towards the sealing plate 62 side. With the above, even if a strong impact or the like is applied to the secondary battery, damage in the connection 78 between the positive electrode collector member 30A and the positive electrode lead terminal 30B can be suppressed. Similarly, in the negative electrode collector tabs 22 as well, damage in the connection between the negative electrode collector member 32A and the negative electrode lead terminal 32B can be suppressed by providing a single bent portion.

Second Modification

FIG. 8 is a partial cross-sectional view of a vicinity of the positive electrode collector member 30A in the short direction of the sealing plate 62.

As illustrated in FIG. 8, in the secondary battery according to the second modification, two electrode bodies 10A and 10B that have the same structure are accommodated inside the battery case 60. Furthermore, pluralities of positive electrode collector tabs 20A and 20B connected to the positive electrode plates in end portions of the electrode bodies 10A and 10B on the sealing plate 62 side are bunched together and connected to a single positive electrode collector member 30A.

In the second modification, the positive electrode collector tab 20A include two bent portions 100A and 110A, and the positive electrode collector tab 20B include two bent portions 100B and 110B. Furthermore, each of the two bent portions (100A and 110A) and (100B and 110B) are bent in opposite directions.

In the second modification, by providing the two bent portions (100A and 110A) and (100B and 110B) in the positive electrode collector tabs 20A and 20B, the positive electrode collector tabs 20A and 20B themselves can apply pushing force that pushes the positive electrode collector member 30A towards the sealing plate 62 side. With the above, even if a strong impact or the like is applied to the secondary battery, damage in the connection between the positive electrode collector member 30A and the positive electrode lead terminal 30B can be suppressed.

Similarly, by also providing the two bent portions in each of the two sets of negative electrode collector tabs 22 drawn out from the two electrode bodies 10A and 10B at end portions on the sealing plate 62 side, damage in the connection between the negative electrode collector member 32A and the negative electrode lead terminal 32B can be suppressed.

Third Modification

FIG. 9 is a cross-sectional view schematically illustrating a configuration of a secondary battery according to a third modification of the present invention.

As illustrated in FIG. 9, in the secondary battery according to the third modification, the structures of the positive and negative electrode lead terminals 30B and 32B and the positive and negative electrode external terminals 50 and 52 are different from those illustrated in FIG. 1.

In other words, each of the rivet-shaped lead terminals 30B and 32B penetrate through the sealing plate 62 and are riveted and fixed to the sealing plate 62 with gaskets 91 and 93 interposed therebetween. Furthermore, the external terminals 50 and 52 are connected to the lead terminals 30B and 32B, respectively, and are disposed on the outer side of the sealing plate 62.

Furthermore, the positive and negative electrode collector tabs 20 and 22 that have been drawn out from the end portions of the electrode body 10 on the sealing plate 62 side are connected to the positive and negative electrode collector members 30A and 32A, respectively. Furthermore, the end portions of the positive and negative electrode collector members 30A and 32A are drawn out to the positive and negative electrode lead terminals 30B and 32B, respectively, provided on the inner side of the sealing plate 62, and are connected to the positive and negative electrode lead terminals 30B and 32B, respectively, by welding or the like.

In the third modification as well, the electrode body 10 is accommodated inside the battery case 60 while having the plurality of positive electrode collector tabs 20 and the plurality of negative electrode collector tabs 22 include at least one bent portions in the inner space defined by the sealing plate 62.

The secondary battery having such a structure is assembled in a process similar to the process illustrated in FIGS. 2 to 4.

In other words, similar to the process illustrated in FIGS. 2 and 3, the plurality of positive electrode collector tabs 20 that are drawn out from the end portion of the electrode body 10 are bunched together and stacked, and are mounted on the positive electrode collector member 30A. Subsequently, the positive electrode collector tabs 20 and the positive electrode collector member 30A are connected to each other by ultrasonic joining or resistance welding, for example.

Subsequently, similar to the process illustrated in FIG. 4, the sealing plate 62, the positive electrode external terminal 50, the gasket 91, and the positive electrode lead terminal 30B are connected and fixed to each other in advance as a single member, and the positive electrode collector member 30A to which the positive electrode collector tabs 20 have been connected is mounted on the single member. In so doing, the positive electrode collector member 30A is mounted so that the end portion thereof overlaps the positive electrode lead terminal 30B. Subsequently, the portion of the positive electrode collector member 30A that overlaps the positive electrode lead terminal 30B is connected to the positive electrode lead terminal 30B by laser welding, for example. Subsequently, the sealing plate 62 is rotated and the electrode body 10 is accommodated in the battery case 60. Lastly, the opening portion of the battery case 60 is sealed with the sealing plate 62 and the secondary battery of the third modification is assembled.

In the above, the electrode body 10 is accommodated in the battery case 60 while having the positive electrode collector tabs 20 be in a bent state in the inner space defined by the sealing plate 62. Note that the negative electrode collector tabs 22, the negative electrode collector member 32A, the negative electrode lead terminal 32B, and the negative electrode external terminal 52 are assembled by a method similar to the above.

In the third modification as well, the positive electrode collector member 30A is not connected to the sealing plate 62 and is only connected to the positive electrode lead terminal 30B at the portion where the positive electrode collector member 30A overlaps the positive electrode lead terminal 30B. Accordingly, similar to the case illustrated in FIG. 5, when a strong impact or the like is applied to the secondary battery, the positive electrode collector member 30A is pulled by the positive electrode collector tabs 20 and vibrates about the connection between the positive electrode collector member 30A and the positive electrode lead terminal 30B. As a result, a large load is applied to the connection between the positive electrode collector member 30A and the positive electrode lead terminal 30B and the connection may become damaged or broken.

However, in the third modification as well, by providing at least one bent portion in the plurality of positive electrode collector tabs 20, the positive electrode collector tabs 20 themselves can apply the pushing force F that pushes the positive electrode collector member 30A towards the sealing plate 62 side. With the above, even if a strong impact or the like is applied to the secondary battery, damage in the connection between the positive electrode collector member 30A and the positive electrode lead terminal 30B can be suppressed.

Similarly, by also providing at least one bent portion in the plurality of negative electrode collector tabs 22 drawn out from the electrode body 10 at the end portion on the sealing plate 62 side, damage in the connection between the negative electrode collector member 32A and the negative electrode lead terminal 32B can be suppressed.

Although the present invention has been described through the desired exemplary embodiment, such a description is not a limitation and, naturally, various modifications can be made. For example, while examples of the positive and negative electrode collector members 30A and 32A, lead terminals 30B and 32B, and external terminals 50 and 52 having structures illustrated in FIGS. 1 and 9 have been described in the exemplary embodiment and the modifications described above, the present invention is not limited to such structures. Note that in such a case, it is only sufficient that, at the least, the lead terminals 30B and 32B are provided on the inner side of the sealing plate 62 and are fixed to the sealing plate 62 while connected to the external terminals 50 and 52.

Note that the secondary battery according to the present invention is not limited to any particular type and the present invention can be applied to a lithium ion secondary battery and a nickel-hydrogen secondary battery, for example. Furthermore, the structure of the electrode body 10 is not limited to any particular structure. Furthermore, known materials can be used for the positive electrode, the negative electrode, the separator, the electrolyte, and other members.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
an electrode body including a positive electrode plate and a negative electrode plate;
a battery case provided with an opening portion, the battery case accommodating the electrode body;
a sealing plate that seals the opening portion;
external terminals provided on an outer side of the sealing plate;
lead terminals provided on an inner side of the sealing plate,
wherein the lead terminals are connected to the external terminals and fixed to the sealing plate;
collector members disposed on the inner side of the sealing plate, the collector members being connected to the lead terminals; and
pluralities of collector tabs connected to the positive electrode plate and the negative electrode plate at an end portion of the electrode body on a sealing plate side, wherein
the pluralities of collector tabs are connected to the collector members,
the electrode body is accommodated inside the battery case while having the pluralities of collector tabs be in a bent state in an inner space defined by the sealing plate,
each plurality of collector tabs include two bent portions in the inner space defined by the sealing plate,
the two bent portion include, in the inner space defined by the sealing plate, a first bent portion formed on the sealing plate side and a second bent portion formed on an electrode body side,
a bent direction of the first bent portion is opposite a bent direction of the second bent portion, and
a bending point in an innermost layer of the second bent portion is, with respect to a bending point in an innermost layer of the first bent portion, on a side opposite a bending point in an outermost layer of the first bent portion,
wherein $W_1 < L$ is satisfied, where $W_1$ is a distance between the bending point in the innermost layer of the second bent portion and the bending point in the innermost layer of the first bent portion in a direction parallel to the sealing plate, and L is a distance between the end portion of the electrode body on the sealing plate side and an inner surface of the sealing plate.

2. The secondary battery according to claim 1, wherein $W_1 < \frac{1}{2}W_2$ is satisfied, where $W_2$ is a width of the electrode body in the direction parallel to the sealing plate.

* * * * *